US012289707B2

(12) United States Patent
Uchida

(10) Patent No.: US 12,289,707 B2
(45) Date of Patent: Apr. 29, 2025

(54) COMMUNICATION METHOD AND COMMUNICATION DEVICE

(71) Applicant: Seiko Epson Corporation, Tokyo (JP)

(72) Inventor: Shuji Uchida, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 359 days.

(21) Appl. No.: 17/699,223

(22) Filed: Mar. 21, 2022

(65) Prior Publication Data

US 2022/0303940 A1   Sep. 22, 2022

(30) Foreign Application Priority Data

Mar. 22, 2021 (JP) ................................. 2021-046969

(51) Int. Cl.
*H04W 64/00* (2009.01)
*H04W 4/02* (2018.01)
*H04W 52/02* (2009.01)

(52) U.S. Cl.
CPC ......... *H04W 64/006* (2013.01); *H04W 4/027* (2013.01); *H04W 52/02* (2013.01)

(58) Field of Classification Search
CPC ....... H04W 4/027; H04W 4/029; H04W 4/80; H04W 84/18; H04W 76/14; H04W 4/38; H04W 84/12; H04W 4/44; H04W 4/33; H04W 4/026; H04W 4/70; H04W 4/48
See application file for complete search history.

(56) References Cited

U.S. PATENT DOCUMENTS

| 7,453,355 | B2 | 11/2008 | Bergstrom et al. |
| 2009/0209278 | A1* | 8/2009 | Narang ................. H04W 48/16 455/522 |
| 2010/0261496 | A1* | 10/2010 | Fukumoto ....... H04W 36/00837 455/517 |
| 2013/0325407 | A1* | 12/2013 | Lee .......................... G06F 17/00 702/188 |
| 2020/0187107 | A1* | 6/2020 | Ogawa .................. H04W 48/18 |
| 2021/0049889 | A1* | 2/2021 | Fukuda .............. G08B 21/0446 |
| 2022/0014878 | A1* | 1/2022 | Lee ....................... H04W 76/14 |

FOREIGN PATENT DOCUMENTS

| JP | 2005-535981 A | 11/2005 |
| JP | 2019-021967 A | 2/2019 |
| JP | 2020-136985 A | 8/2020 |
| WO | 2020-170485 A1 | 8/2020 |

* cited by examiner

Primary Examiner — Kwasi Karikari
(74) Attorney, Agent, or Firm — Harness, Dickey & Pierce, P.L.C.

(57) ABSTRACT

A communication device is a communication device that transmits detection information including position information based on a communication system using LPWA, and includes a position information acquisition unit that acquires the position information, a storage unit that stores the detection information, a communication unit that performs wireless communication in compliance with the communication system, a movement detection unit that detects movement of the communication device, and a control unit that controls a communication speed of the wireless communication by the communication unit, in which, when the movement detection unit detects movement of the communication device, the control unit changes the communication speed.

5 Claims, 6 Drawing Sheets

COMMUNICATION METHOD AND COMMUNICATION DEVICE

The present application is based on, and claims priority from JP Application Serial Number 2021-046969, filed Mar. 22, 2021, the disclosure of which is hereby incorporated by reference herein in its entirety.

BACKGROUND

1. Technical Field

The present disclosure relates to a communication device using a low power wide area (LPWA) communication system and a communication method using the communication device.

2. Related Art

For example, JP 2020-136985 A discloses a communication device capable of transmitting position information based on an LPWA communication system. The communication device is a terminal device for the Internet of Things (IoT), and includes a position information acquisition unit that acquires position information, a movement determination unit that determines whether the communication device has moved after acquiring the position information, and a transmission control unit that controls transmission of the position information based on a determination result by the movement determination unit. Then, the position information transmitted by the terminal device is received by the receiving side device.

However, JP 2020-136985 A does not consider a reception success rate of position information while the terminal device is moving. In the document, the position information is retransmitted when the movement of the terminal device is detected after the position information is transmitted. However, when the terminal device continues to move, it is difficult for the receiving side device to receive the position information because the terminal device is still moving at the time of retransmission.

SUMMARY

A communication device according to the present application is a communication device configured to transmit detection information including position information based on a communication system using LPWA, and includes a position information acquisition unit configured to acquire the position information, a storage unit configured to store the detection information, a communication unit configured to perform wireless communication in compliance with the communication system, a movement detection unit configured to detect movement of the communication device, and a control unit configured to control a communication speed of the wireless communication by the communication unit, in which, when the movement detection unit detects movement of the communication device, the control unit changes the communication speed.

A communication method according to the present application is a communication method for transmitting detection information including position information of a communication device based on an LPWA communication system, and includes acquiring the position information, storing the detection information, detecting movement of the communication device, and, when movement of the communication device is detected, changing a communication speed.

DESCRIPTION OF EXEMPLARY EMBODIMENTS

Embodiments

Overview of Position Detection System

Figure 1:
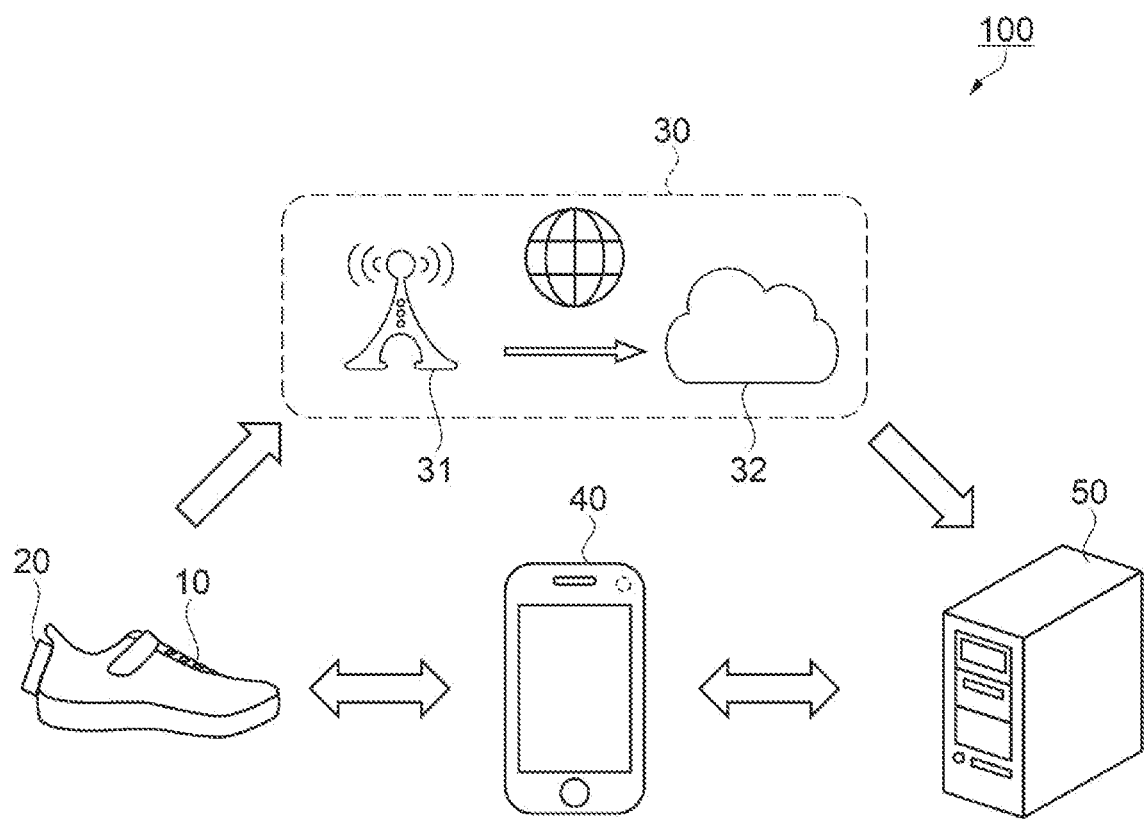
FIG. 1 is a schematic diagram of a position detection system according to an embodiment.

FIG. 1 is a schematic diagram of a position detection system according to an embodiment.

A position detection system 100 of the embodiment is a position detection system that detects a position of a terminal device 20 worn by a target person by using a low power wide area (LPWA) communication system. The target person can be a child, an elderly person who needs to be watched over, or the like. In a preferred example, as illustrated in FIG. 1, the terminal device 20 is attached to a heel of a shoe 10 worn by the target person. Note that the terminal device 20 only needs to be attached directly or indirectly to the target person, and may, for example, be in the form of a wristwatch or attached to a school bag.

As illustrated in FIG. 1, the position detection system 100 includes the terminal device 20 as a communication device, an LPWA network 30, an information communication device 40, a server 50, and the like.

In a preferred example, the Sigfox (registered trademark) network is used as the LPWA network 30. Sigfox is a power-saving wide-area communication standard specialized for the Internet of Things (IoT). Data transmitted from the terminal device 20 including a Sigfox-compliant communication module is received at a base station 31 and stored in the Sigfox cloud 32 via the Internet. The server 50 is provided so as to be able to acquire the data from the Sigfox cloud 32. Note that the network is not limited to Sigfox, but any LPWA network can be used. For example, LoRa (registered trademark), Wi-Fi (registered trademark), HaLow (registered trademark), Wi-SUN (registered trademark), RPMA (registered trademark), Flexnet (registered trademark), and NB-IoT may be used.

The information communication device 40 is, for example, a smartphone and includes a Bluetooth (registered trademark) Low Energy (BLE) communication module. In a preferred example, the information communication device 40 is assumed to be a smartphone carried by a guardian of a person to be watched. For example, when the target person is a child, the information communication device 40 is carried by a child's parent, and when the child is near, the information communication device 40 can perform wireless communication with the terminal device 20 worn by the child via BLE. The owner of the information communication device 40 is not limited to relatives, but may be a person related to the person to be watched. The information communication device 40 also includes a communication module for a mobile communication system using a wireless telephone line and a wireless LAN module.

The server 50 is a host server of the position detection system 100, and manages position information of the terminal device 20 and performs the necessary processing, such as transmitting the position information of the terminal device 20 received via the LPWA network 30 to the information communication device 40.

Configuration of Terminal Device

Figure 2:
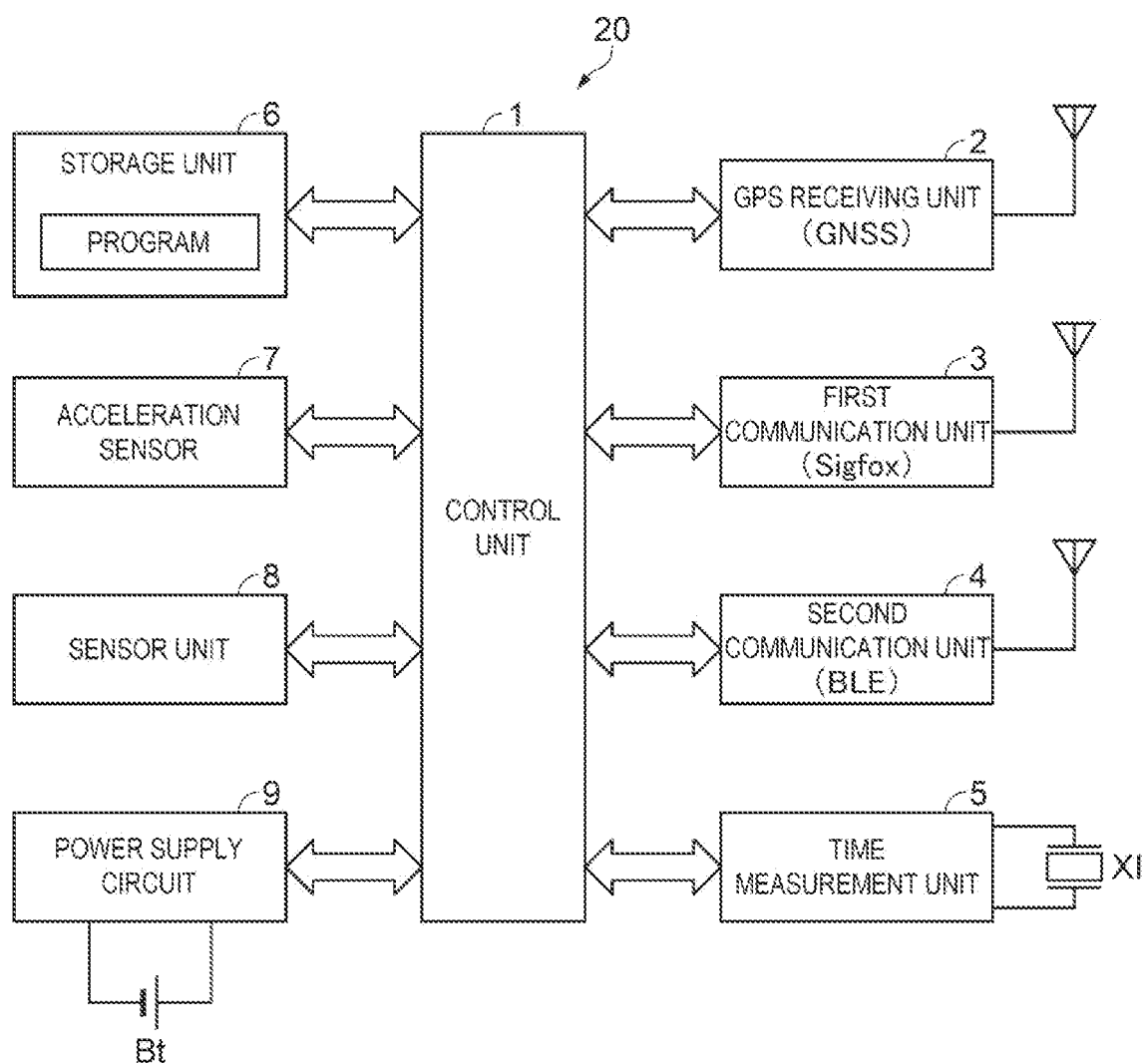
FIG. 2 is a functional block diagram of a terminal device.

FIG. 2 is a functional block diagram of the terminal device.

Next, a configuration of the terminal device 20 will be described.

The terminal device 20 includes a control unit 1, a GPS receiving unit 2, a first communication unit 3, a second communication unit 4, a time measurement unit 5, a storage unit 6, an acceleration sensor 7, a sensor unit 8, a power supply circuit 9, and the like.

The control unit 1 is configured to include a processor, and operates according to a program stored in the storage unit 6 to collectively control the operation of the terminal device 20.

The GPS receiving unit 2 is a position information acquisition unit, receives radio waves from a plurality of GPS satellites, performs positioning using the radio waves, and outputs position information based on a positioning result.

The first communication unit 3 is a communication unit and uses a Sigfox-compliant communication module as a preferred example.

The second communication unit 4 is a BLE communication module.

The time measurement unit 5 is a real-time clock provided with a crystal oscillator XI, and continues to measure the time even when the control unit 1 is off, and supplies time data to the control unit 1.

The storage unit 6 includes a read only memory (ROM) and a random access memory (RAM), and stores programs to be executed by the control unit 1, related data, and the like. The programs are an operation mode switching program, a position tracking program, a power saving mode program, and the like, which will be described later.

The acceleration sensor 7 is a movement detection unit, and in a preferred example, a three-axis (X-axis, Y-axis, and Z-axis) acceleration sensor is used. The acceleration sensor 7 detects the acceleration due to the movement of the terminal device 20, and outputs a detection signal to the control unit 1. The movement detection unit may be a gyro sensor, an IMU, or the like instead of the acceleration sensor.

The sensor unit 8 includes a temperature sensor and a pressure sensor, detects the temperature and altitude around the terminal device 20, and outputs a detection signal to the control unit 1. Any sensor capable of detecting environmental information around the terminal device 20 may be used, for example, an optical sensor may be further provided.

The power supply circuit 9 is a power supply circuit powered by a battery Bt, and supplies an operating voltage to the respective units of the terminal device 20. Further, the power supply circuit 9 detects the voltage of the battery Bt and outputs the detected voltage to the control unit 1 as power supply voltage data. The battery Bt is, for example, a rechargeable battery such as a lithium ion battery, and is provided so as to be rechargeable. When the power supply circuit 9 is being charged, a flag indicating that the battery is being charged is set.

Switching of Operation Mode

Figure 3:
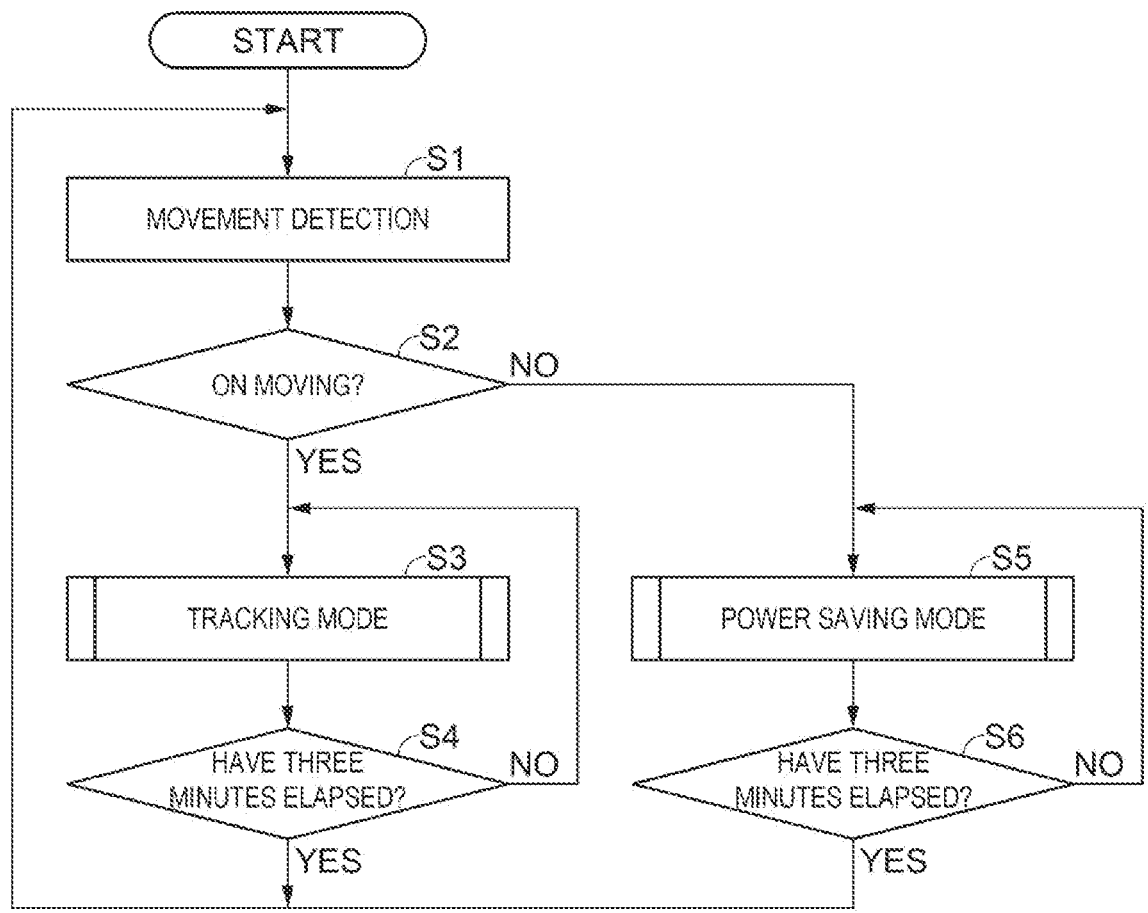
FIG. 3 is a flowchart illustrating switching of an operation mode of the terminal device.

FIG. 3 is a flowchart illustrating switching of an operation mode of the terminal device.

Next, the operation mode of the terminal device will be described, referring mainly to FIG. 3, but also to FIG. 2.

The terminal device 20 has two modes of operation, a tracking mode for detecting the position of the terminal device 20 and a power saving mode. By switching between these modes according to the movement status of the terminal device 20, the terminal device 20 can be driven for a long time by the battery Bt.

The following processing related to the switching of the operation mode of the terminal device 20 is executed by the control unit 1 controlling the respective units according to the operation mode switching program in the storage unit 6.

In step S1, movement detection is performed by the acceleration sensor 7. Note that the detection signal is temporarily stored in the storage unit 6.

In step S2, it is determined from the detection signal detected by the acceleration sensor 7 whether the terminal device 20 is moving. If it is determined that the terminal device 20 is moving, the process proceeds to step S3. If it is determined that the terminal device 20 is not moving, the process proceeds to step S5.

In step S3, the operation mode is set to the tracking mode, and the processing in the tracking mode, including the positioning detection described later, is executed.

In step S4, based on the time data of the time measurement unit 5, it is determined whether three minutes have elapsed in the tracking mode. If three minutes have elapsed, the process returns to step S1. If it is less than three minutes, the process returns to step S3 to continue the processing in the tracking mode.

In step S5, the operation mode is set to the power saving mode, and the processing in the power saving mode described later is executed.

In step S6, based on the time data of the time measurement unit 5, it is determined whether three minutes have elapsed in the power saving mode. If three minutes have elapsed, the process returns to step S1. If it is less than three minutes, the process returns to step S5 to continue the processing in the power saving mode.

Flow of Processing in Tracking Mode

Figure 4:
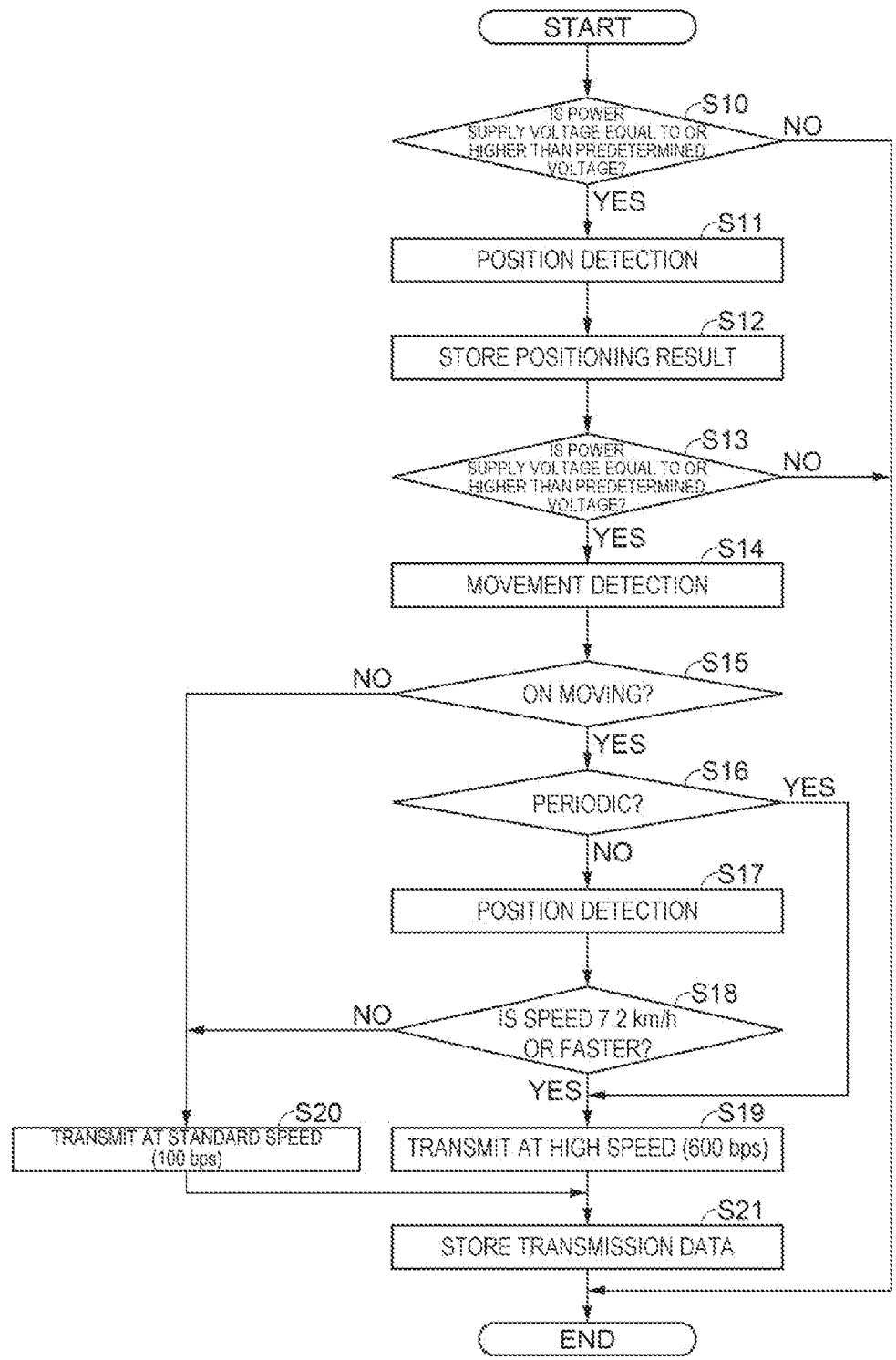
FIG. 4 is a flowchart illustrating a flow of processing in a tracking mode.

FIG. 4 is a flowchart illustrating a flow of processing in the tracking mode.

Next, the flow of processing in the tracking mode will be described, referring mainly to FIG. 4, but also to FIG. 2. The following processing is executed by the control unit 1 as a main operation unit controlling the respective units according to the position tracking program in the storage unit 6. The processing includes a communication method using the terminal device 20.

In step S10, based on the power supply voltage data from the power supply circuit 9, it is determined whether the power supply voltage is equal to or higher than a predetermined voltage required for operation. If the voltage is equal to or higher than the predetermined voltage, the process proceeds to step S11. If the voltage is lower than the predetermined voltage, the power is turned off and the operation of the terminal device 20 is terminated.

In step S11, the GPS receiving unit 2 acquires position information. At this time, the number of GPS satellites that were able to receive waves with valid signal strength is also acquired.

In step S12, the positioning data acquired in step S11, including the position information, the number of GPS satellites, and the acquisition time, is stored in the storage unit 6.

In step S13, based on the power supply voltage data from the power supply circuit 9, it is determined whether the power supply voltage is equal to or higher than the predetermined voltage required for operation. If the voltage is equal to or higher than the predetermined voltage, the process proceeds to step S14. If the voltage is lower than the predetermined voltage, the power is turned off and the operation of the terminal device 20 is terminated.

In step S14, movement detection is performed by the acceleration sensor 7. Note that the detection signal is temporarily stored in the storage unit 6.

In step S15, the detection signal acquired in step S14 is analyzed to determine whether the terminal device 20 is moving. If it is determined that the terminal device 20 is moving, the process proceeds to step S16. If it is determined that the terminal device 20 is not moving, the process proceeds to step S20.

In step S16, the detection signal acquired in step S14 is analyzed to determine whether a periodic component is contained. If the periodic component is contained, the process proceeds to step S19. If no periodic component is contained, the process proceeds to step S17.

Figure 5:
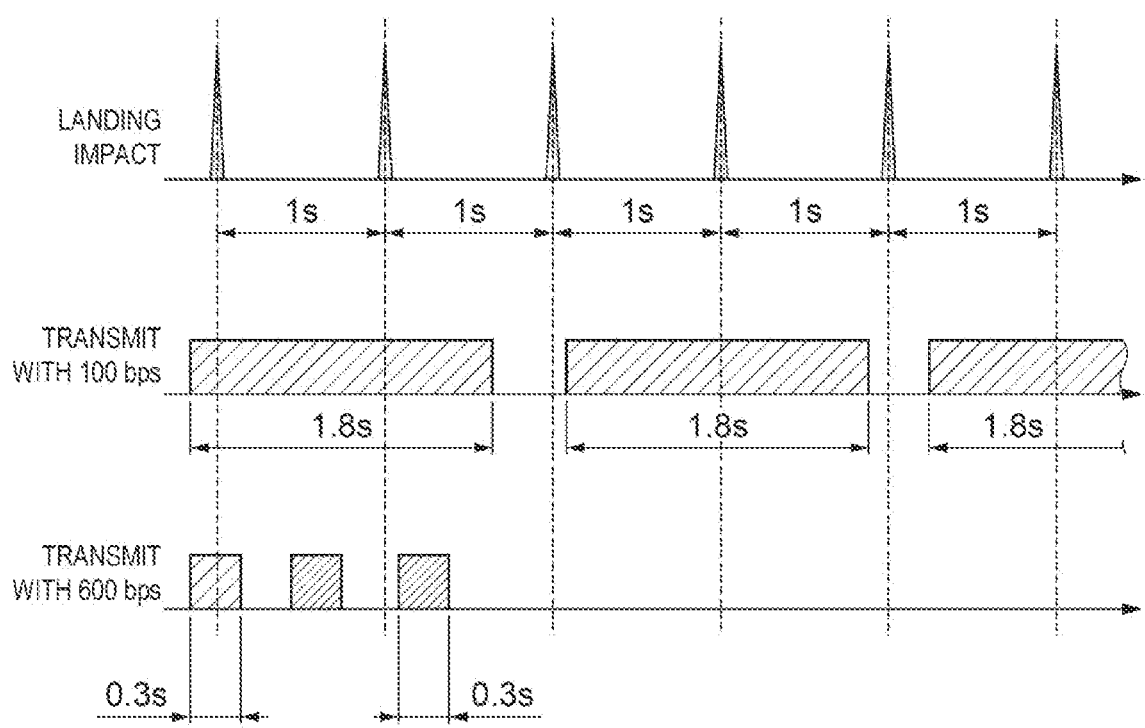
FIG. 5 is a timing chart illustrating a relationship between a transmission signal from the terminal device and a landing impact due to movement.

FIG. 5 is a timing chart illustrating a relationship between a transmission signal from the terminal device 20 and a landing impact due to movement. Here, the relationship between the Sigfox transmission signal transmitted from the terminal device 20 and the landing impact due to the movement will be described.

FIG. 5 illustrates the time required for transmitting the positioning signal from the terminal device 20 with time (sec) on the horizontal axis. As illustrated in FIG. 5, when transmitting a signal at 100 bits per second (bps), which is a standard speed of Sigfox, it takes approximately 1.8 seconds to transmit one frame. Here, when the target person wearing the terminal device 20 is moving on foot, as illustrated in FIG. 5, it can be understood that the landing impact due to walking occurs at intervals of approximately one second, and that this landing impact overlaps the transmission period of 100 bps. In other words, when moving by walking, the periodic component due to the landing impact appears in the detection signal. According to the results of experiments conducted by the inventors, when a landing impact occurs during the transmission period of a transmission signal, the reception success rate at the Sigfox base station 31 becomes low. It is considered that the acceleration due to the landing impact affects the transmission signal.

When transmitting positioning signals from the terminal device 20 in Sigfox, signals with different frequencies from each other are transmitted three times. However, when the transmission rate is 100 bps, as illustrated in FIG. 5, the landing impact occurs during all three transmission periods, resulting in a low reception success rate at the base station 31.

In contrast, when the transmission rate of the transmission signal is set to a high speed of 600 bps, it is possible to transmit one frame at approximately 0.3 seconds. Therefore, as illustrated in FIG. 5, even when the transmission period overlaps with the landing impact for one of the three times, the reception success rate at the base station 31 can be increased because the transmission period does not overlap with the landing impact for the remaining two times. Note that the communication speed is not limited to 600 bps, but may be any communication speed that does not overlap or does not frequently overlap with the landing impact.

Returning to FIG. 4, and the description will be continued.

In step S17, the GPS receiving unit 2 acquires position information. Note that the position information and the acquisition time are temporarily stored in the storage unit 6.

In step S18, it is determined whether the moving speed of the terminal device 20 is 7.2 km/h (a predetermined speed) or faster. In detail, the moving distance is derived from the position information acquired in step S11 and the position information acquired in step S17, and the movement speed of the terminal device 20 is calculated by dividing the derived moving distance by the difference between the acquisition times of the two sets of position information. In step S18, whether the target person is moving by a means of transportation that does not generate a landing impact, such as a bicycle, is determined by using the speed of 7.2 km/h, which corresponds to a fast walk, as a threshold. If the moving speed is 7.2 km/h or faster, the process proceeds to step S19. If the moving speed is slower than 7.2 km/h, the process proceeds to step S20. Note that the predetermined speed as the threshold is not limited to 7.2 km/h.

In step S19, the positioning data stored in step S12 and the detection information including the identifier (ID) information of the terminal device 20 are transmitted by the first communication unit 3 at a high speed of 600 bps. In step S20, the positioning data stored in step S12 and the detection information including the ID information of the terminal device 20 are transmitted by the first communication unit 3 at a standard speed of 100 bps. In other words, in steps S15 to S20, when the movement of the terminal device 20 is detected, the control unit 1 changes the communication speed.

In step S21, the detection information including the positioning data transmitted in step S19 or step S20, and the transmission time are stored in the storage unit 6. Note that the detection information and the transmission time stored here correspond to the last transmission data, and are stored until the next update.

In addition to the positioning data, the detection information may also include environmental information and power supply voltage. For example, when the position information is detected in step S11, the sensor unit 8 detects the temperature and altitude in parallel, and the detected data is stored in the storage unit 6 as environmental information in step S12. The power supply voltage acquired in step S10 or step S13 is also stored in the storage unit 6.

Then, in step S19 or step S20, the detection information including the positioning data, the environmental information, and the power supply voltage may be transmitted.

Flow of Processing in Power Saving Mode

Figure 6:
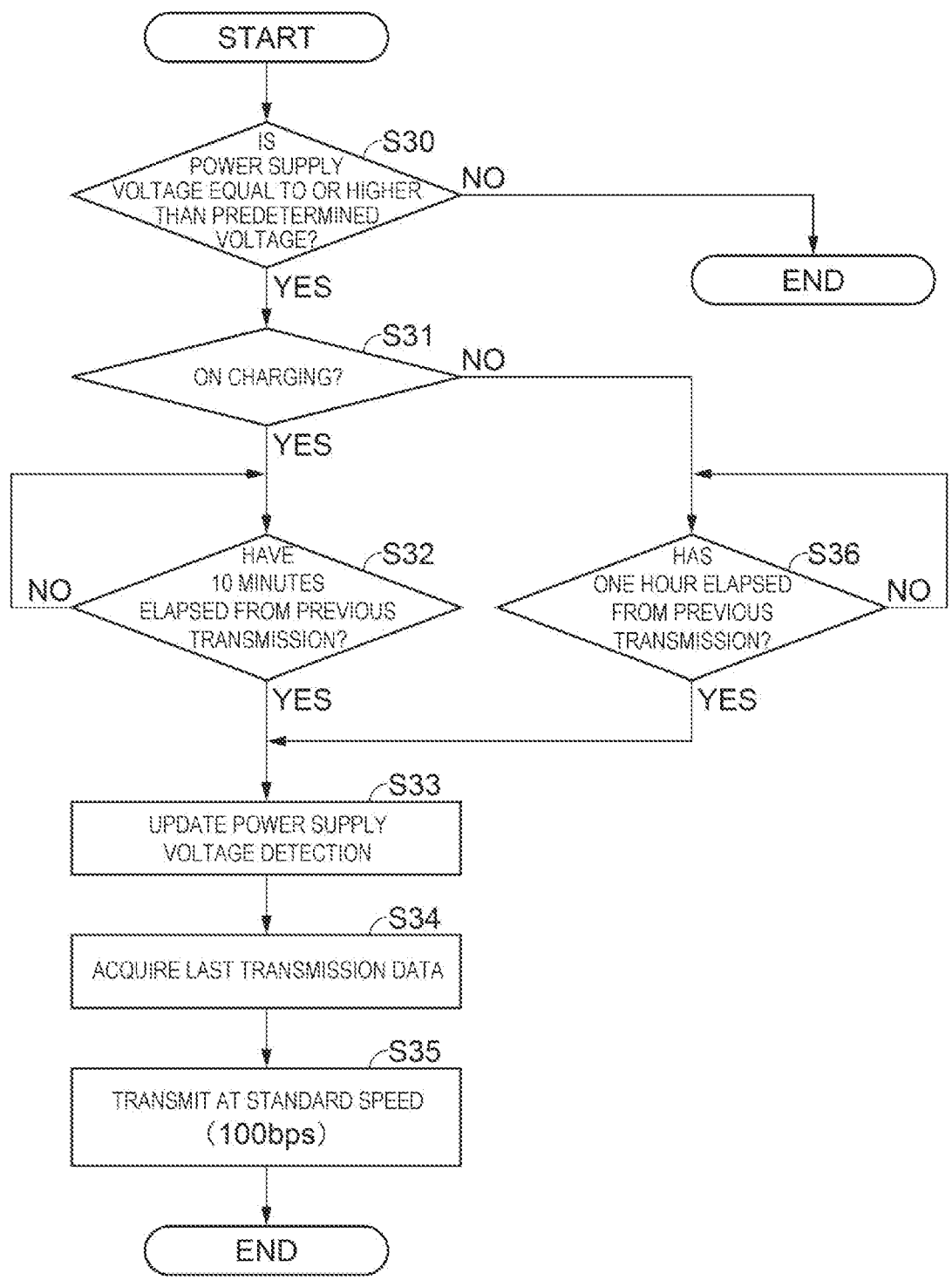
FIG. 6 is a flowchart illustrating a flow of processing in a power saving mode.

FIG. 6 is a flowchart illustrating a flow of processing in the power saving mode.

Next, the flow of processing in the power saving mode will be described, referring mainly to FIG. 6, but also to FIG. 2. The following processing is executed by the control unit 1 as a main operation unit controlling the respective units according to the power saving mode program in the storage unit 6.

In step S30, based on the power supply voltage data from the power supply circuit 9, it is determined whether the power supply voltage is equal to or higher than a predetermined voltage required for operation. If the voltage is equal to or higher than the predetermined voltage, the process proceeds to step S31. If the voltage is lower than the predetermined voltage, the power is turned off and the operation of the terminal device 20 is terminated.

In step S31, a flag indicating a charging state of the power supply circuit 9 is checked to determine whether charging is in progress. If charging is in progress, the process proceeds to step S32. If charging is not in progress, the process proceeds to step S36.

In step S32, based on the current time data from the time measurement unit 5 and the transmission time of the last transmission data in the storage unit 6, it is checked whether 10 minutes have elapsed since the last transmission of the transmission signal containing the positioning data in the tracking mode. If 10 minutes have elapsed, the process proceeds to step S33. If 10 minutes have not elapsed, the process returns to step S32.

In step S33, the power supply voltage is detected by the power supply circuit 9 and the power supply voltage of the last transmission data stored in the storage unit 6 is updated. During charging, the power supply voltage fluctuates greatly, so it is necessary to update the voltage information to the latest one.

In step S34, the last transmission data including the positioning data is acquired from the storage unit 6.

In step S35, the transmission signal containing the positioning data acquired in step S34 is transmitted by the first communication unit 3 at a standard speed of 100 bps.

In step S36, based on the current time from the time measurement unit 5 and the transmission time of the last transmission data in the storage unit 6, it is checked whether one hour has elapsed since the last transmission of the transmission signal containing the positioning data in the tracking mode. If one hour has elapsed, the process proceeds to step S34. If one hour has not elapsed, the process returns to step S36.

As described above, in the power saving mode, position detection and movement detection, which consume a large amount of power, are not performed, and when a predetermined time has elapsed since the last transmission, the last detection information is again transmitted, thereby indicating that the target person stays in the same position. In other words, when the state in which the movement of the terminal device 20 is not detected by the acceleration sensor 7 continues, the terminal device 20 again transmits the last detection information after a predetermined time has elapsed since the transmission of the last detection information.

Communication Method with Smartphone

Returning to FIG. 1, the description will be continued.

The information communication device 40 has an application installed for checking the position of the terminal device 20 and performing wireless communication with the terminal device 20. When the application is activated, in a case in which the terminal device 20 is within the communication range of BLE, an icon of the terminal device 20 is displayed on a screen of the information communication device 40. When the icon is selected, a command for requesting detection information is transmitted from the information communication device 40 to the terminal device 20 via BLE wireless communication. The terminal device 20 that receives the request command then transmits the detection information to the information communication device 40 via BLE. As a result, a guardian carrying the information communication device 40 can understand and manage the state of the terminal device 20. For example, in a preferred example, since the detection information includes the power supply voltage, the guardian can charge the terminal device 20 when charging is necessary.

In addition, when the guardian in a remote location outside the BLE communication range wants to check the position of the terminal device 20, the guardian can acquire the position information of the terminal device 20 from the server 50 via a wireless telephone line or wireless LAN by operating a position detection button on the operation screen of the application. For example, the position of the terminal device 20 is identifiable in a map displayed on the screen of the information communication device 40.

As described above, according to the terminal device 20 and the communication method using the terminal device 20 of the embodiment, the following effects can be obtained.

The terminal device 20 as a communication device includes the GPS receiving unit 2 as the position information acquisition unit configured to acquire the position information, the storage unit 6 configured to store the detection information, the first communication unit 3 configured to perform wireless communication in compliance with the communication system using LPWA, the acceleration sensor 7 as the movement detection unit configured to detect movement of the terminal device 20, and the control unit 1 configured to control a communication speed of the wireless communication by the first communication unit 3. Then, when the acceleration sensor 7 detects the movement of the terminal device 20, the control unit 1 changes the communication speed.

For example, when the person to be watched wearing the terminal device 20 is moving on foot, the shock wave due to the walking may affect the transmission of the detection information and reduce the reception success rate. Further, the Sigfox base station 31 does not return a reception response even when the Sigfox base station 31 receives a signal from the terminal device 20, so that the success or failure of reception is not known by the terminal device 20, and highly accurate transmission is required.

According to the terminal device 20, when it is detected that the terminal device 20 is moving, the transmission can be completed in the gap of the shock waves by increasing the communication speed, so that the reception success rate at the receiving side device can be improved. Accordingly, it is possible to provide the terminal device 20 capable of reliably transmitting position information even when the terminal device 20 is moving.

When the detection signal, in which the movement of the terminal device 20 is detected by the acceleration sensor 7, contains a periodic component, the control unit 1 increases the communication speed.

When the detection signal contains the periodic component, it is presumed that the person to be watched is walking. Thus, when the periodic component is contained, the influence of the landing impact on the transmission signal can be reduced by increasing the communication speed. Accordingly, the reception success rate at the base station 31 can be increased.

The control unit 1 detects the speed of the movement of the terminal device 20 based on the change in the position information by the GPS receiving unit 2, and when the speed of the movement is equal to or higher than the predetermined speed, the control unit 1 increases the communication speed.

In a preferred example, the predetermined speed is set to 7.2 km/h, which is the speed of fast walking. Thus, when the target person is moving by a means of transportation that does not generate a landing impact, such as a bicycle, and is moving at a high speed, the communication speed is increased. As an example, the moving speed is set to a high speed of 600 bps. This is because there is no landing impact, but the moving speed is high, so there is a concern that other communication failures may occur due to the movement. For example, it is assumed that the target person is passing through a place with poor communication conditions during transmission, such as when the target person is traveling by bicycle on a road between tall buildings. Even in such a case, since one frame can be transmitted in approximately 0.3 seconds, the reception success rate at the base station 31 can be increased as compared with the standard speed of 100 bps.

On the other hand, when the moving speed is about the same as that of normal walking, there is little concern about communication failure, so that transmission at the standard speed of 100 bps is not a problem.

The detection information transmitted from the terminal device 20 includes the position information and the power supply voltage or the environmental information.

Thus, it is possible to inform the guardian carrying the information communication device 40 of the temperature and altitude of the environment where the person to be watched is located. Further, when the power supply voltage requires charging, the guardian can charge the terminal device 20.

When the movement of the terminal device 20 is not detected by the acceleration sensor 7, the control unit 1, after the predetermined time from last transmission of the detection information, causes the first communication unit 3 to re-transmit the last transmitted detection information.

Thus, it is possible to inform the guardian carrying the information communication device 40 that the person to be watched stays at the same position.

The communication method by the terminal device 20 is a communication method for transmitting the detection information including the position information based on the LPWA communication system, and includes acquiring the position information by the GPS receiving unit 2, storing the detection information by the storage unit 6, detecting the movement of the terminal device 20 by the acceleration sensor 7, and when the movement of the terminal device 20 is detected by the acceleration sensor 7, changing the communication speed by the first communication unit 3.

According to this communication method, when it is detected that the terminal device 20 is moving, the transmission can be completed in the gap of shock waves by increasing the communication speed, so that the reception success rate at the receiving side device can be improved. Accordingly, it is possible to provide the communication method for the terminal device 20 capable of reliably transmitting position information even when the terminal device 20 is moving.

What is claimed is:

1. A communication device comprising:
   a GPS receiver configured to receive position information of the communication device;
   an acceleration sensor configured to detect movement of the communication device held by a user and to provide a detection signal;
   a communication interface configured to communicate with a communication system using LPWA;
   a memory configured to store a program; and
   a processor configured to execute the program so as to:
   receive the position information and the detection signal;
   determine whether the communication device is moving based on the position information and the detection signal;
   communicate with the communication system at a first communication speed via the communication interface when the processor determines that the communication device is not moving;
   determine whether a periodic component is contained in the detection signal, wherein the periodic component corresponds to a plurality of landing impacts of a foot of the user due to the movement caused by walking of the user; and
   communicate with the communication system at a second communication speed via the communication interface when the processor determines that the periodic component is contained in the detection signal,
   wherein the second communication speed is higher than the first communication speed,
   an impact interval between two adjacent landing impacts of the plurality of landing impacts is shorter than a first period of time to send one frame of a positioning signal corresponding to the position information from the communication device to the communication system at the first communication speed, and
   the impact interval is longer than a second period of time to send the one frame of the positioning signal from the communication device to the communication system at the second communication speed.

2. The communication device according to claim 1, wherein
   the processor is further configured to detect a speed of the movement based on a change in the position information,
   when the speed of the movement is equal to or higher than a predetermined speed, the processor is configured to communicate with the communication system at a third communication speed via the communication interface, and
   the third communication speed is higher than the second communication speed.

3. The communication device according to claim 1, wherein
   the processor is further configured to send power supply voltage information or environmental information to the communication system via the communication interface.

4. The communication device according to claim 1, wherein
   when the movement of the communication device is not detected by the acceleration sensor, the processor is further configured to, after a predetermined time elapses from last transmission to the communication system via the communication interface, re-transmit the detection signal.

5. A communication method for causing a processor to execute a program stored in a memory, the communication method comprising executing on the processor the steps of:
   acquiring position information of a communication device via a GPS receiver;
   communicating with a communication system via a communicating interface using LPWA;
   detecting movement of the communication device held by a user via an acceleration sensor to provide a detection signal;
   determining whether the communication device is moving based on the position information and the detection signal;
   communicating with the communication system at a first communication speed via the communication interface when the processor determines that the communication device is not moving;
   determining whether a periodic component is contained in the detection signal, wherein the periodic component corresponds to a plurality of landing impacts of a foot of the user due to the movement caused by walking of the user; and communicating with the communication system at a second communication speed via the communication interface when the processor determines that the periodic component is contained in the detection signal, wherein the second communication speed is higher than the first communication speed, an impact interval between two adjacent landing impacts of the plurality of landing impacts is shorter than a first period of time to send one frame of a positioning signal corresponding to the position information from the communication device to the communication system at the first communication speed, and the impact interval is longer than a second period of time to send the one frame of the positioning signal from the communication device to the communication system at the second communication speed.

\* \* \* \* \*